UNITED STATES PATENT OFFICE.

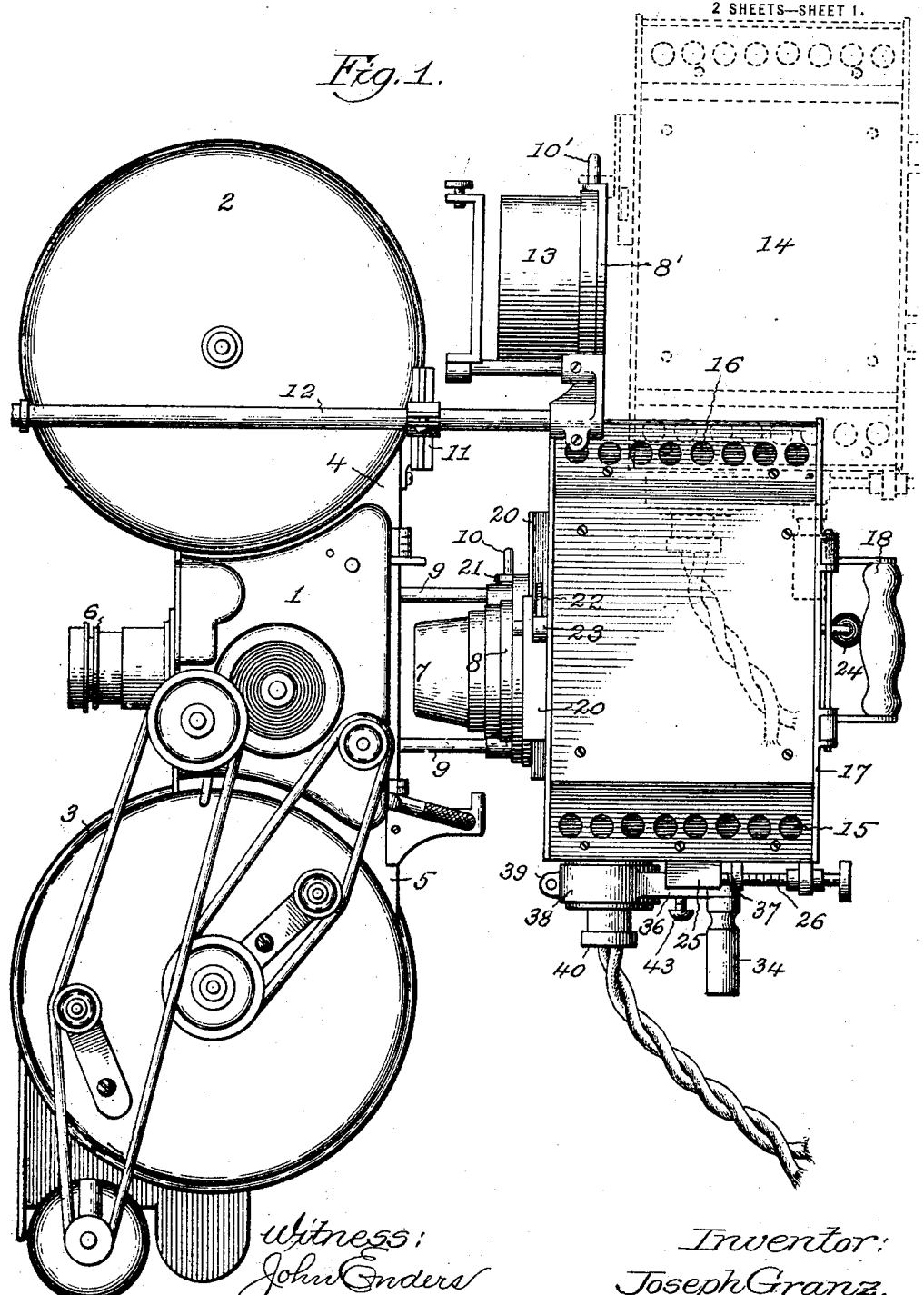

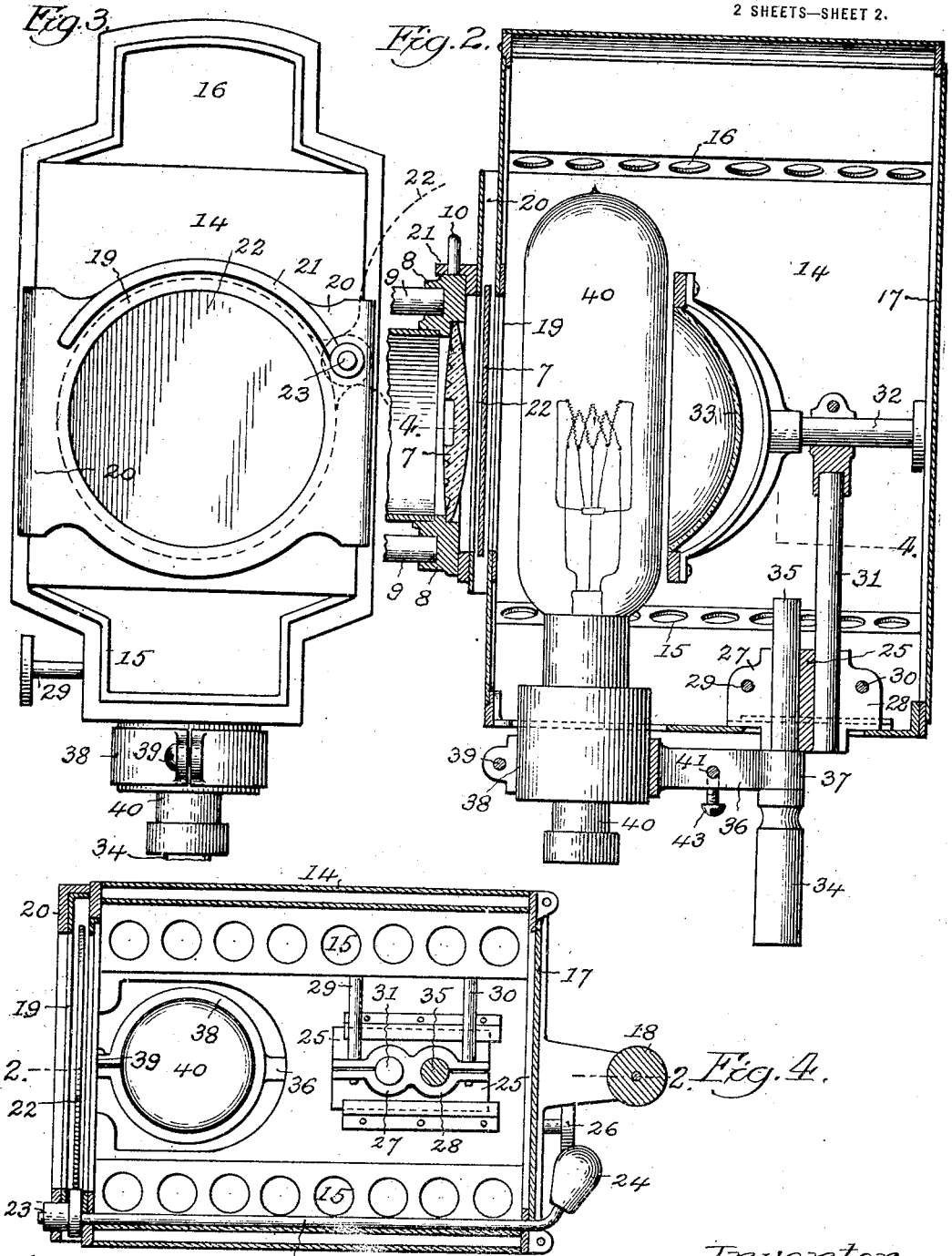

JOSEPH GRANZ, OF DULUTH, MINNESOTA.

OPTICAL PROJECTION APPARATUS.

1,375,089.  Specification of Letters Patent.  Patented Apr. 19, 1921.

Original application filed March 28, 1919, Serial No. 285,760. Divided and this application filed February 21, 1920. Serial No. 360,529.

*To all whom it may concern:*

Be it known that I, JOSEPH GRANZ, a citizen of Czechoslovakia, and a resident of Duluth, in the county of Saint Louis, State of Minnesota, have invented certain new and useful Improvements in Optical Projection Apparatus, of which the following is a specification.

This invention relates to the lamp house or illuminating means for motion picture machines and like optical projection apparatus, and is a division of my application Serial No. 285,760, filed March 28, 1919. And the objects of the present improvements are:

To provide a simple and efficient structural formation and association of parts whereby a single lamp house is adapted for ready removal and attachment to one or the other of a motion picture machine and a stereopticon apparatus that have associated relation upon a single supporting base.

To provide a light and heat intercepting shutter or dowser adapted for ready and convenient manual actuation from the rear of the lamp house, and adapted to permit or shut off the passage of the light and heat rays from the lamp house to the particular optical projection apparatus to which said lamp house is applied, and as circumstances in actual use may require, all as will hereinafter more fully appear.

In the accompanying drawings:—

Figure 1, is a side elevation illustrating the general association of parts in a combined motion picture machine and stereopticon embodying the present invention.

Fig. 2, is a longitudinal sectional elevation of the lamp house on line 2—2 Fig. 4.

Fig. 3, is a front elevation of said lamp house. Fig. 4, is a horizontal section of the same on line 4—4 Fig. 2.

Like reference numerals indicate like parts in the several views.

Referring to the drawings, 1 designates a main shell or casing forming the main chamber of a motion picture machine and adapted to contain the film actuating drums, film guiding means, etc., of the same.

2 and 3 designate the respective upper and lower film magazines of the usual drum form, adapted to receive in a removable and replacable manner the usual film reels of the machine, and fixedly secured to upper and lower saddle formations 4 and 5 of the main casing 1.

6 designates the objective or front lens member of the machine, secured to the front of the casing 1 in a position which brings the optical center of the machine at the mid-height and mid-width of the aforesaid main casing.

7 designates the condenser or rear lens member of the motion picture machine. In the present improvement the carrying frame 8 of the condenser is of an annular form and is secured to the rear wall of the casing 1 by horizontal bracket rods 9, and said carrying frame 8 is provided at its upper end or crown with a vertically extending stud 10 for the purpose hereinafter stated.

11 designates a bracket or brackets secured to one side of the upper film magazine 2 and adapted to support a horizontal guide rail or rails 12, at the forward end of which is suitably mounted the usual objective or front lens system (not shown,) of a stereopticon or like optical projection apparatus, while at the rear end of such rail or rails 12 is suitably mounted the condenser or rear lens member 13 of said apparatus, as shown in Fig. 1.

In the present improvement the holding frame 8' of the condenser 13 is of a substantially counterpart construction to that of the holding frame 1 of the motion picture machine heretofore described, and provided at its upper end or crown with a vertically extending stud 10' for the purpose hereinafter stated.

14 designates the body portion of the lamp house or lantern of an optical projection apparatus, preferably of the rectangular and double wall construction shown and provided with ventilating openings 15 at its lower end, with a ventilating cowl structure 16 at its upper end, with a door 17 at its open rear end affording convenient access to the lamp mechanisms within the lamp house, and with a hand grip 18 at its rear end for convenient handling of the lamp house.

19 designates the usual light orifice in the front wall of the lamp house 14, the axis of which is adapted to register with the axes or centers of the condensers or rear lens members 7 and 13 heretofore described, and by means as follows:

20 designates a vertical plate member secured in spaced relation to the front wall of the lamp body 14 and having side flanges adapted to provide a narrow containing chamber open at top and bottom, for the light and heat intercepting shutter or dowser hereinafter described. The plate member 20 is provided with a light orifice in line with the heretofore described light orifice 19 of the lamp body and forming a continuation of said orifice 19.

21 designates a segmental or saddle shape bracket flange having fixed attachment to the lamp body 14 and disposed centrally over the light orifices just described. The flange 21 is preferably formed as a part of the aforesaid plate member 20, and is provided with a central vertical orifice adapted to fit over and engage either vertical stud 10 or 10' of the motion picture machine or the stereopticon apparatus, to support the lamp house in proper operative relation with one or the other of said apparatus. With the described structure the forward vertical face of the plate member 20 is adapted to bear or abut against the rear face of one or the other carrying frame 8 or 8' of the condensers 7, 13, to aid in a stable attachment of the lamp house in the two relations just described.

22 designates the light intersecting shutter or dowser above referred to, preferably of a circular disk form pivotally mounted at one edge upon an operating shaft as follows:—

23 designates the operating shaft above referred to, journaled longitudinally in the lamp house 14 and carrying at its forward end the shutter 22 aforesaid, while its rear end extends back of said lamp house and carries an operating hand lever 24 to provide a convenient means for operating the shutter or dowser 22 from the usual position of the operator at the rear of the projecting apparatus.

25 designates a sliding block moving in longitudinal guides on the floor portion of the lamp house 14 and adapted for limited longitudinal adjustment by means of an adjusting screw mechanism 26, as illustrated in Fig. 1. In the present construction the sliding head 25 is formed with a pair of vertical orifices arranged in parallel relation, with the shells or walls 27, 28 of said orifices slotted vertically and provided with transverse clamping screws 29, 30 whereby said shells or walls may be circularly constricted to clamp and hold in place the stems or spindles of the lamp parts now to be described.

31 designates a supporting stem arranged in a vertically adjustable manner in the orifice of the rearward shell 28 aforesaid, and adapted to be clamped therein by the screw 30. At its upper end the stem 31 supports in a longitudinally adjustable manner the horizontal carrying stem 32 of the reflector 33 of the illuminating means.

34 designates a hand grip or handle having at its upper end a cylindrical stem 35 adapted for engagement in the orifice of the forward shell 27 aforesaid, and adapted to be clamped therein by the screw 29 aforesaid.

36 designates a horizontally arranged yoke member having at one end a sleeve or yoke 37 adapted for attachment to the upper portion of the hand grip or handle 34 aforesaid, and at its other end a sleeve or yoke 38 and clamping screw 39 adapted to receive and hold the base or socket portion of the incandescent lamp 40 used as the illuminant in the lamp house.

41 designates an adjustable stop stem mounted transversely at the mid-length of the yoke member 36 aforesaid and adapted to have abutment against a fixed lug or flange on the bottom of the lamp house 14, as described in detail in my application for patent Serial No. 285,760, filed March 28, 1919, and of which the present application is a division. The stop stem 41 is secured at its adjustment by a clamping screw 43 and by its adjustment insures the proper positioning of the lamp 40 in a horizontal plane, with relation to the optical center of the lamp house. The adjustment of the lamp 40 in a vertical plane, with relation to said optical center is attained by the clamping sleeve 38 and screw 39 above described during the initial assemblage of the clamp unit parts heretofore described.

Having thus fully described my said invention, what I claim as new and desire to secure by Letters Patent, is:—

1. A motion picture machine and an optical projection apparatus secured in associated relation and each provided with an individual condenser at the rear end, each condenser having an inclosing frame, a single lamp house provided at its forward end with a saddle flange, and interengaging means on said saddle flange and the inclosing frames of said condensers for attaining detachable connection of the lamp house to either of said condensers.

2. A motion picture machine and an optical projection apparatus secured in associated relation and each provided with an individual condenser at the rear end, each condenser having a vertically projecting pin on the crown of its carrying frame, and a single lamp house provided at its forward end with a saddle flange having a central orifice adapted to engage one or the other of the vertical pins of the condensers.

3. A motion picture machine having a condenser mounted at its rear end by horizontal posts connecting the machine and condenser frame together, said condenser having at its crown a central vertical pin, an optical projection apparatus having fixed relation to the motion picture machine and provided at its rear end with a condenser the frame of which is provided at its crown with a central vertical pin, and a single lamp house provided at its forward end with a saddle flange having a central orifice adapted to engage one or the other of the vertical pins of the condensers.

4. A motion picture machine comprising a main casing and associated upper and lower film magazines and provided with a condenser at its rear end, the frame of said condenser having at its crown a central vertical pin, an optical projection apparatus secured to the side of the upper magazine aforesaid and provided at its rear end with a condenser the frame of which is provided at its crown with a central vertical pin, and a single lamp house provided at its forward end with a saddle flange having a central orifice adapted to engage one or the other of the vertical pins of the condensers.

5. A lamp house for optical projection apparatus, comprising a main casing having a light aperture in its front wall, a plate having an aperture alined with the aperture of the main casing and provided with vertically arranged offset portions at its sides for attachment to the wall of the main casing and providing a chamber open at top and bottom between the plate and casing to provide free vertical air circulation through the chamber, a shutter of the plate form pivotally mounted in said chamber, and a carrying shaft for said shutter extending rearwardly through the main casing and having an operating handle at its rear end.

6. A lamp house for optical projection apparatus, comprising a main casing having a light aperture in its front wall, a plate having an aperture alined with the aperture of the main casing and provided with vertically arranged offset portions at its sides for attachment to the wall of the main casing and providing a chamber open at top and bottom between the plate and casing to provide free vertical air circulation through the chamber, a shutter of the plate form pivotally mounted in said chamber, a carrying shaft for said shutter extending rearwardly through the main casing and having an operating handle at its rear end, and a supporting saddle bracket secured to the upper portion of said plate and at a point forward and clear of the open top of the chamber formed by such plate.

Signed at Duluth, Minn., this 13th day of February, 1920.

JOSEPH GRANZ.